Patented Nov. 7, 1933

1,934,335

UNITED STATES PATENT OFFICE 1,934,335

ELECTRICAL INSULATING MATERIAL

Willoughby Statham Smith, Benchams, Newton Poppleford, and Henry Joseph Garnett, Lymne, Solefields, Sevenoaks, and John Norman Dean, Orpington, England No Drawing. Application December 1, 1930, Serial No. 499,406, and in Great Britain December 6, 1929

11 Claims. (Cl. 106—13)

This invention relates to improvements in electrical insulating materials suitable for the insulation of submarine telegraph and telephone conductors.

In the copending application of W. S. Smith et al., Serial No. 322,572, filed Nov. 28, 1928 there is described a submarine telephone or other signalling cable insulated with a material possessing a low leakance of under about 2 micromicromhos per cm³ at 1000 cycles and at 75° F. or a corresponding leakance of under 6 micromicromhos per cm³ at 2000 cycles and 32° F., and which comprises gutta percha and/or balata from which resins and dirt impurities have been removed by treating the material to remove the resin, then dissolving the material in a solvent such, for example, as benzine, and subsequently removing the residue of dirt by a process of separation.

The purified gutta percha and/or balata with which the above-mentioned submarine signalling cable is insulated, is very hard and horny and it has been found that not only is a large amount of power consumed in applying it to the conductor, with a consequent heavy wear and tear of the machinery, but that great care and skill are required to obtain a sound insulating covering free from cracks and fissures.

In the co-pending application of W. S. Smith et al., Serial No. 431,330, filed Feb. 25, 1930 the submarine telephone or other signalling conductor has an insulation comprising gutta percha and/or balata, purified as above, with which is intimately admixed rubber or synthetic rubber in proportions of up to 50% of the mixture.

As a result of this intimate incorporation of the rubber, the hardness of the purified gutta percha and/or balata is diminished.

Electrical insulating material is prepared, in accordance with the present invention, by intimately incorporating with the wholly or partly deresinated gutta percha and/or balata, a semisolid refined petroleum product such as petroleum jelly. The petroleum jelly should be substantially free from ash and acidity.

In some cases raw rubber may be added to the mixture. The raw rubber may be natural rubber of good commercial quality, or it may first have been subjected to a purifying treatment, whereby its non-rubber constituents have been wholly or partially removed, or synthetic rubber may be used.

The gutta percha and/or balata may be subjected to any suitable process to remove the resins and in some cases it is desirable that the dirt be removed also as for example described in the copending application Serial No. 322,572, referred to above.

A suitable method of forming the intimate mixture of petroleum jelly and deresinated gutta percha consists in placing the gutta percha which had previously been heated and softened in a mixing machine and adding the petroleum jelly little by little at a low temperature such that the gutta percha just remains plastic and at such a rate that the mixture remains in coherent pieces, the mixing operation being continued until the petroleum jelly is intimately incorporated with the gutta percha. When the mixture also includes rubber, the latter is preferably first masticated and then incorporated in the gutta percha in the usual manner preferably before the addition of the petroleum jelly. Or, if desired, the rubber preferably after mastication, is well mixed with the petroleum jelly first and this mixture then added to and thoroughly mixed with the gutta percha in the way described above.

It is to be understood that where the gutta percha and/or balata contains an inappreciable resin content that the petroleum jelly or other petroleum product may be directly added thereto.

The principal advantage of the new insulating material is that the deresinated gutta percha is softened sufficiently by the addition of the petroleum jelly or of the petroleum jelly and rubber to make its application to the conductor simpler and that the insulated core is more easily obtained free from fissures and cracks.

When masticated rubber alone is used to soften the deresinated gutta percha, it tends to give a tacky product. A further advantage of the new insulating material is that this tendency is removed by the incorporation of the petroleum jelly owing to the greasy nature of the latter and also because of its preservative action on the gutta percha and rubber.

Other advantages accruing from the addition of the petroleum jelly are that the cost is thereby lowered and that the electrical properties are improved.

In the absence of rubber, the proportion of petroleum jelly to be added to the deresinated gutta percha will depend upon the hardness of the latter, the required degree of softness of the resultant insulating material and of course the amount of resin that has been removed or is present in the gutta percha. The combined percentage of resin and pertoleum jelly present in the mixture may be made up to about 50% and good mechanical and electrical results have been obtained with mixtures of a hard deresinated gutta percha with up to 50% of petroleum jelly.

This figure is a limit from the practical point of view, if it is desired that the gutta percha shall be hard and firm when cold, with a softening point above the temperature likely to be met with in practice. Quantities of petroleum jelly in excess of 50% however, yield materials with valuable properties from the point of view of cable "compounds".

It has now been found that mixtures of gutta percha with more than 15% of petroleum jelly tend to "sweat", that is to say, they tend to exude in the course of time an oily layer on their surfaces. This phenomenon of sweating is commonly exhibited by balata containing its full complement of oily natural resins, which sweating can however, be entirely inhibited by subjecting the balata to the process of heat treatment described in Specification No. 326,481.

It has been found that, as in the case of balata containing its natural resins, so also with mixtures of gutta percha and/or balata and petroleum jelly, the sweating or exudation of the greasy layer on the outside surface can be prevented by subjecting the material to heat treatment. The existence or absence of sweating in these compositions containing petroleum jelly may be detected by examining the samples in ultra-violet light from which the visible rays have been screened. Thus when a sample of a composition comprising 40% of petroleum jelly and 60% of deresinated gutta percha is examined at intervals in ultra-violet light, the characteristic fluorescence of the petroleum product will be visible strongly on the surface after a few days if the material has not been heat-treated, while a heat treated but otherwise identical sample will remain unchanged, as far as can be at present ascertained, for an indefinite time.

In order therefore to render the materials in accordance with the invention satisfactorily permanent, it is desirable that they should be heat treated in accordance with the method described in the copending application of W. S. Smith et al, Serial No. 413,398, filed December 11, 1929, this method including subjecting the material to a heat-treatment at a temperature below its limiting temperature, rapidly chilling the material, reheating it to the same temperature, and maintaining the material at this temperature until hardening occurs. This is more especially the case with those compositions of deresinated gutta percha and/or balata which comprise more than 15% of the admixed paraffin hydrocarbons.

It will be found that the heat treatment temperatures for mixtures of petroleum jelly and deresinated gutta percha or balata are substantially the same as those for the pure deresinated gutta percha or balata with no admixed material.

This is peculiar in that the ordinary gutta percha and/or balata with full complement of resin, or even partly deresinated will not stand so high a temperature without undue softening as will the deresinated material. It is thought that the petroleum jelly is not truly soluble in the deresinated material at temperatures below the softening point, or only to a slight extent, with the result that the gutta remains as a coherent and colloidal structure in which is dispersed the petroleum jelly. This condition is best obtained when the proper heat treatment has been carried out. These remarks are made merely by way of an explanation, and in no way affect the facts.

As a consequence of this remarkable fact, the following very useful properties are exhibited by these materials:

1. A soft pliable mass at 70° C. more plastic than the deresinated gutta percha.
2. Setting firmly and quickly when the temperature is lowered and doing so nearly as rapidly and approximately at the same temperature as deresinated gutta percha.
3. When set, forming a body which though less tough than the deresinated gutta alone is yet harder than would be expected from the proportion of soft petroleum jelly added.

These remarks do not apply to those mixtures in which rubber is added. It seems that the rubber is soluble in the gutta, and the petroleum jelly in the rubber at temperatures below softening point, consequently softening the actual structure. The materials containing rubber therefore must have a special schedule of heat treatment worked out according to the method given in the copending application Serial No. 413,398 referred to above.

When rubber is also present in the mixture, the proportion of petroleum jelly required to produce a certain degree of softness in a given sample of deresinated gutta percha will be diminished.

*Example 1*

|  | Leakance | Dielectric constant | Plasticity |
|---|---|---|---|
| Deresinated gutta percha | 6 | 2.86 | 50 divisions. |
| The same sample of deresinated gutta percha + 10% vaseline. | 5 | 2.56 | 60 divisions. |

Further examples of gutta percha + petroleum jelly:

Parts
2. Deresinated and dirt-free gutta percha__ 90
   Petroleum jelly_____ 10
3. Deresinated and dirt-free gutta percha____ 60
   Petroleum jelly_____ 40
4. Deresinated and dirt-free gutta percha____ 50
   Petroleum Jelly_____ 20
   First quality plantation crepe I. R. deproteinized _____ 30
5. Deresinated balata_____ 75
   Petroleum jelly_____ 25

| No. | Dielectric constant | Leakance per cm cube | Plasticity at 70° C. |
|---|---|---|---|
| 2 | 2.45 | 4.0 | 60 divisions. |
| 3 | 2.4 | 3.0 | 80 divisions. |
| 4 | 2.5 | 4.5 | 76 divisions. |
| 5 | 2.5 | 5.5 | 69 divisions. |

Nos. 2, 3 and 5 were heat treated as for dirt and resin-free gutta percha, i. e. heated slowly from 30° C. to 60° C. over a period of 24 hours.

Nos. 1 and 4 were not heat treated.

In the above examples the value of the leakance is given in micromicromhos per centimetre cube at 2000 cycles and 32° F.

The plasticity was measured by the following method:—A ball, having a diameter of 1 cm, is moulded from the material to be tested, care being taken to see that the moulded object contains no air bubbles. The ball is placed under a weighted rod with a disc shaped end about 1.5 cm in diameter supported so that the latter just rests upon the ball and the apparatus is placed in a water-bath heated to 70° C. When the moulded ball has been heated right through to this temperature, the loaded rod is freed so that it can fall under its own weight, being retarded only by the resistance of the gutta percha ball. At the end of 10 seconds the depth of fall is measured by means of a second rod which carries a rack and engages with a pinion operating a needle that moves over a scale graduated in 180 divisions, and the depth of fall of the rod is therefore measured by observing the displacement of the needle.

The displacement of the needle in the ten seconds during which the loaded rod is free to fall is given here as the measure of the plasticity and obviously the higher the figure the softer is the material.

This invention is applicable to balata or gutta percha from which the resins have been removed, the resins being replaced by petroleum jelly, the material thus obtained being finally submitted to heat treatment applied as determined by the method of the copending application Serial No. 413,398 referred to above. The resultant product has improved electrical properties, but is obtained at a cost similar to that of the original material.

By "semi-solid refined petroleum product" is meant any petroleum product having substantially a jelly consistency.

What we claim is:—

1. Electrical insulating material comprising gutta percha of low resin content with which is admixed as a diluent not more than 50% of a semi-solid refined petroleum product.

2. Electrical insulating material comprising dirt free gutta percha of low resin content with which is admixed as a diluent not more than 50% of a semi-solid refined petroleum product.

3. Electrical insulating material comprising gutta percha of low resin content with which is intimately admixed as a diluent not less than 10% of a semi-solid refined petroleum product.

4. Electrical insulating material comprising gutta percha of low resin content with which is intimately admixed not less than 10% and not more than 50% of a semi-solid refined petroleum product.

5. Electrical insulating material comprising gutta percha of low resin content with which is intimately admixed not less than 10% and not more than 50% of a petroleum product consisting mainly of paraffin hydrocarbons.

6. Electrical insulating material comprising gutta percha of low resin content with which is intimately admixed more than 15% of a semi-solid refined petroleum product and which material has been heat-treated to prevent sweating.

7. Electrical insulating material comprising gutta percha of low resin content with which is intimately admixed from substantially 10% to substantially 50% of a semi-solid refined petroleum product and which material has been heat-treated to prevent sweating.

8. Electrical insulating material comprising gutta percha from which resins have been extracted, with which is admixed a semi-solid refined petroleum product as a diluent, the combined resin and petroleum product content preventing sweating of the material and not exceeding substantially 50%.

9. Electrical insulating material comprising dirt free gutta percha of low resin content with which is intimately admixed more than 10% of a semi-solid refined petroleum product, the material being heat-treated to prevent sweating when the content of the petroleum product exceeds 15%.

10. Electrical insulating material comprising gutta percha of low resin content with which is intimately admixed at least 10% and not more than 50% of a semi-solid refined petroleum product, together with not more than 40% of rubber.

11. Electrical insulating material comprising gutta percha of low resin content with which is intimately admixed as a diluent not less than 10% of a semi-solid refined petroleum product, together with not more than 40% of rubber.

WILLOUGHBY STATHAM SMITH.
HENRY JOSEPH GARNETT.
JOHN NORMAN DEAN.